USO11819102B2

(12) United States Patent
Karl

(10) Patent No.: US 11,819,102 B2
(45) Date of Patent: Nov. 21, 2023

(54) SPINNER WHEEL ASSEMBLY FOR A LUGGAGE CASE

(71) Applicant: Samsonite IP Holdings S.a r.l., Luxembourg (LU)

(72) Inventor: Philip J. Karl, Rehoboth, MA (US)

(73) Assignee: Samsonite IP Holdings S.a r.l., Luxembourg (LU)

( * ) Notice: Subject to any disclaimer, the term of this patent is extended or adjusted under 35 U.S.C. 154(b) by 126 days.

(21) Appl. No.: 15/193,791

(22) Filed: Jun. 27, 2016

(65) Prior Publication Data

US 2017/0367450 A1    Dec. 28, 2017

(51) Int. Cl.
| | |
|---|---|
| *A45C 5/14* | (2006.01) |
| *B60B 33/00* | (2006.01) |
| *B60B 19/14* | (2006.01) |
| *B60B 5/02* | (2006.01) |
| *B60B 3/00* | (2006.01) |
| *A45C 5/03* | (2006.01) |
| *A45C 13/26* | (2006.01) |

(52) U.S. Cl.
CPC .................. *A45C 5/14* (2013.01); *A45C 5/03* (2013.01); *A45C 13/262* (2013.01); *B60B 3/001* (2013.01); *B60B 5/02* (2013.01); *B60B 19/14* (2013.01); *B60B 33/0042* (2013.01); *B60B 33/0052* (2013.01); *B60B 33/0057* (2013.01); *B60B 33/0068* (2013.01); *B60B 33/0076* (2013.01); *A45C 2013/267* (2013.01); *B60B 2200/45* (2013.01)

(58) Field of Classification Search
CPC ......... A45C 5/14; A45C 13/262; A45C 5/146; A45C 13/385; A45C 3/004; A45C 5/03
USPC .................. 190/18 A, 18 R; 280/37; D3/318
See application file for complete search history.

(56) References Cited

U.S. PATENT DOCUMENTS

| | | | |
|---|---|---|---|
| 386,902 A * | 7/1888 | Stillman .................. | A45C 5/00 190/18 R |
| 849,334 A * | 4/1907 | Likly et al. | |
| D47,390 S | 5/1915 | Schwab | |
| 1,936,701 A | 11/1933 | Wilson | |
| 1,940,823 A | 12/1933 | Shinn | |
| 2,086,557 A | 7/1937 | Kaptuller | |
| D114,527 S | 5/1939 | Boden | |
| 2,738,542 A | 3/1956 | Clark, Jr. | |
| 2,830,545 A | 4/1958 | Robinson et al. | |

(Continued)

FOREIGN PATENT DOCUMENTS

| | | |
|---|---|---|
| CA | 2720562 A1 | 10/2009 |
| CH | 477999 A | 9/1969 |

(Continued)

OTHER PUBLICATIONS

Japan Platform for Patent Information (J-Plat Pat) (Year: 2021).*
Search for Japanese Application 2015-44922 (Year: 2022).*

*Primary Examiner* — Tri M Mai
(74) *Attorney, Agent, or Firm* — Dorsey & Whitney LLP

(57) ABSTRACT

A spinner wheel assembly for a luggage case is provided. The wheel assembly may include a housing, a support strut rotatably coupled to the housing about a spinner axis, and a plurality of wheels each rotatably coupled to the support strut about a wheel axis. Each wheel may rotate in a plane positioned at an angle to at least one other wheel. Each wheel may be coupled to the support strut in a spaced relationship thereto.

20 Claims, 5 Drawing Sheets

(56) References Cited

U.S. PATENT DOCUMENTS

| | | |
|---|---|---|
| 2,914,340 A | 11/1959 | Black |
| 2,923,961 A | 2/1960 | Black |
| 2,942,290 A | 6/1960 | Segal |
| 2,987,752 A | 6/1961 | Black |
| 3,040,370 A * | 6/1962 | Ford ................. B60B 33/08 16/31 R |
| 3,102,744 A | 9/1963 | Reuter et al. |
| 3,214,786 A | 11/1965 | Butsch |
| 3,222,708 A | 12/1965 | Butsch |
| 3,922,754 A * | 12/1975 | Andersen ........... B60B 33/0028 16/18 R |
| 4,027,898 A | 6/1977 | Steen |
| 4,084,288 A | 4/1978 | Black |
| 4,161,803 A * | 7/1979 | Propst ................ B60B 33/0042 16/18 A |
| 4,336,629 A | 1/1982 | Jarvis, Jr. et al. |
| 4,392,668 A | 7/1983 | Mulholland |
| 4,403,784 A | 9/1983 | Gray |
| 4,422,212 A | 12/1983 | Sheiman et al. |
| 4,649,595 A | 3/1987 | Shane |
| 4,752,986 A * | 6/1988 | Rivkin ................ B60B 33/0021 16/18 A |
| 4,759,097 A | 7/1988 | Black |
| 5,068,943 A | 12/1991 | Estkowski |
| 5,075,924 A * | 12/1991 | Estkowski .......... B60B 33/0042 16/18 A |
| D359,676 S | 6/1995 | Liang |
| 5,533,231 A | 7/1996 | Bai |
| 5,615,450 A | 4/1997 | Butler |
| 5,634,538 A | 6/1997 | Tsai |
| D384,629 S | 10/1997 | Nagashima |
| 5,785,154 A | 7/1998 | Chen |
| 5,967,535 A | 10/1999 | King |
| 5,992,588 A * | 11/1999 | Morszeck ................ A45C 5/14 280/37 |
| D421,338 S | 3/2000 | Moon |
| D433,088 S | 10/2000 | Galy |
| D434,904 S | 12/2000 | Huang |
| 6,193,324 B1 | 2/2001 | Chang |
| D438,382 S | 3/2001 | Chang |
| D439,410 S | 3/2001 | Chang |
| 6,256,835 B1 | 7/2001 | Wang |
| D448,278 S | 9/2001 | Chi |
| D448,826 S | 10/2001 | Galy |
| 6,322,156 B1 | 11/2001 | Kuo |
| 6,409,196 B1 | 1/2002 | McFarland |
| 6,354,412 B1 | 3/2002 | Kuo |
| 6,357,793 B1 | 3/2002 | Dickie et al. |
| 6,478,315 B1 | 11/2002 | Manesis |
| D470,748 S | 2/2003 | Tsai |
| 6,532,623 B1 | 3/2003 | Watanabe |
| D473,379 S | 4/2003 | Moon |
| 6,539,578 B1 | 4/2003 | Guttmann et al. |
| D474,024 S | 5/2003 | Santy |
| D476,484 S | 7/2003 | Santy et al. |
| D481,931 S | 11/2003 | Chi |
| D482,265 S | 11/2003 | Wicha |
| D484,028 S | 12/2003 | Moon |
| D487,348 S | 3/2004 | Fenton et al. |
| D491,365 S | 6/2004 | Proot |
| D492,894 S | 7/2004 | Cheng |
| 6,776,428 B2 | 8/2004 | Strong |
| D496,259 S | 9/2004 | Cheng |
| 6,789,810 B2 | 9/2004 | Strong |
| D505,316 S | 5/2005 | Topel |
| 6,892,421 B2 | 5/2005 | Cooper et al. |
| 6,908,087 B2 | 6/2005 | Wintersgill et al. |
| D513,560 S | 1/2006 | Neumann |
| D525,033 S | 7/2006 | Neumann |
| D539,543 S | 4/2007 | Wu |
| D541,047 S | 4/2007 | Moon |
| D541,048 S | 4/2007 | Moon |
| 7,210,690 B2 | 5/2007 | Yi-Cheng |
| 7,213,818 B2 | 5/2007 | Chang |
| D550,950 S | 9/2007 | Vanderminden |
| D556,555 S | 12/2007 | Tamara |
| D556,556 S | 12/2007 | Tamara |
| D557,900 S | 12/2007 | Sijmons |
| D575,512 S | 8/2008 | Moon |
| D575,957 S | 9/2008 | Scicluna et al. |
| D576,407 S | 9/2008 | Moon |
| 7,437,801 B2 | 10/2008 | Dahl |
| D581,161 S | 11/2008 | Tong |
| D582,160 S | 12/2008 | Sijmons |
| D582,678 S | 12/2008 | Rekuc |
| 7,497,449 B2 | 3/2009 | Logger |
| 7,506,404 B2 | 3/2009 | Block et al. |
| D592,490 S | 5/2009 | Frame |
| D603,163 S | 11/2009 | Van Himbeeck |
| 7,657,969 B2 | 2/2010 | Trivini |
| 7,744,102 B2 | 6/2010 | Balley et al. |
| 7,832,533 B2 | 11/2010 | Selvi |
| 7,891,051 B2 | 2/2011 | Chou |
| D633,299 S | 3/2011 | Moon |
| D634,124 S | 3/2011 | Fair |
| D643,705 S | 8/2011 | Maeda et al. |
| 8,020,679 B2 | 9/2011 | Wu |
| D652,216 S | 1/2012 | Fair |
| D659,395 S | 5/2012 | Sijmons |
| 8,452,508 B2 | 5/2013 | Frolik et al. |
| 8,490,243 B2 | 7/2013 | Guo et al. |
| 8,533,908 B2 | 9/2013 | Scicluna |
| D697,717 S | 1/2014 | Santy |
| D698,153 S | 1/2014 | Santy |
| 8,662,516 B1 | 3/2014 | Slagerman |
| D703,442 S | 4/2014 | Parker |
| 8,752,243 B2 | 7/2014 | Guo et al. |
| 8,783,420 B2 * | 7/2014 | Lai ................... A45C 5/145 188/69 |
| 8,783,700 B2 | 7/2014 | Li |
| 8,806,714 B2 | 8/2014 | Eguchi |
| 8,807,584 B2 | 8/2014 | Lasher |
| 8,850,658 B2 * | 10/2014 | Dayt ................ B60B 33/0042 16/31 R |
| 8,863,354 B2 * | 10/2014 | Dayt ................ B60B 33/0068 16/45 |
| D718,938 S * | 12/2014 | Parker .......................... D3/318 |
| D721,497 S | 1/2015 | Parker |
| D721,501 S | 1/2015 | Parker |
| D728,354 S | 5/2015 | Fan |
| D729,051 S | 5/2015 | Fan |
| D732,293 S | 6/2015 | Parker et al. |
| 9,044,656 B2 | 6/2015 | Zhang |
| 9,049,908 B2 * | 6/2015 | Jiang ................... A45C 5/145 |
| D735,022 S | 7/2015 | Fan |
| D741,599 S | 10/2015 | Parker |
| 9,216,754 B2 | 12/2015 | Chen |
| D753,920 S | 4/2016 | Parker |
| D755,524 S | 5/2016 | Parker |
| D767,280 S | 9/2016 | Parker |
| 9,788,623 B1 * | 10/2017 | Chen ................... A45C 13/36 |
| D841,330 S | 2/2019 | Karl |
| D841,331 S | 2/2019 | Karl |
| D841,332 S | 2/2019 | Karl |
| 2002/0069479 A1 | 6/2002 | Kuo |
| 2002/0144375 A1 | 10/2002 | Drucker et al. |
| 2004/0111830 A1 | 6/2004 | Cooper et al. |
| 2006/0043688 A1 | 3/2006 | Chang |
| 2007/0056141 A1 | 3/2007 | Armano et al. |
| 2007/0119661 A1 | 5/2007 | Chang |
| 2008/0007022 A1 | 1/2008 | Jones |
| 2008/0116660 A1 | 5/2008 | Nicholls |
| 2008/0120803 A1 | 5/2008 | Bryant |
| 2009/0031533 A1 | 2/2009 | Yan |
| 2010/0230223 A1 | 9/2010 | Wu |
| 2011/0168508 A1 | 7/2011 | Jiang |
| 2012/0005858 A1 | 1/2012 | Lai |
| 2012/0086193 A1 | 4/2012 | Guo |
| 2012/0160617 A1 * | 6/2012 | Qi ....................... B60T 1/04 188/1.12 |
| 2012/0255141 A1 | 10/2012 | Lin et al. |
| 2012/0311821 A1 | 12/2012 | Eguchi |

(56) References Cited

U.S. PATENT DOCUMENTS

| | | | |
|---|---|---|---|
| 2013/0062843 A1* | 3/2013 | Riddiford | A45C 3/04 280/47.26 |
| 2013/0093155 A1 | 4/2013 | Gong | |
| 2013/0205544 A1 | 8/2013 | Dayt et al. | |
| 2014/0041978 A1 | 2/2014 | Chang | |
| 2014/0110204 A1 | 4/2014 | Wu | |
| 2014/0232077 A1 | 8/2014 | Zhang | |
| 2014/0262661 A1 | 9/2014 | Mathieu et al. | |
| 2015/0014108 A1 | 1/2015 | Vecellio | |
| 2015/0102573 A1 | 4/2015 | Hillaert et al. | |
| 2015/0150347 A1 | 6/2015 | Scicluna | |
| 2016/0286914 A1 | 10/2016 | Hillaert et al. | |

FOREIGN PATENT DOCUMENTS

| | | |
|---|---|---|
| CN | 201194600 Y | 2/2009 |
| CN | 101443201 B | 12/2010 |
| CN | 201675239 U | 12/2010 |
| CN | 202278929 U | 6/2012 |
| CN | 102578778 A | 7/2012 |
| CN | 202407510 | 9/2012 |
| CN | 202528768 | 11/2012 |
| CN | 102991559 A | 3/2013 |
| CN | 202782503 U | 3/2013 |
| DE | 29710837 U1 | 8/1997 |
| DE | 20309968 U1 | 8/2003 |
| EM | 001175822-0002 | 4/2009 |
| EM | 002514364-0002 | 8/2014 |
| EM | 002563783-0003 | 10/2014 |
| EM | 002872192-0001 | 11/2015 |
| EM | 002872192-0002 | 11/2015 |
| EM | 002872192-0011 | 11/2015 |
| EM | 002872192-0012 | 11/2015 |
| EM | 002872192-0015 | 11/2015 |
| EP | 0075456 A1 | 3/1983 |
| EP | 0051995 A1 | 11/1986 |
| EP | 1117311 A1 | 7/2001 |
| EP | 2862473 A1 | 4/2015 |
| EP | 3075567 A1 | 10/2016 |
| FR | 2007012 A1 | 1/1970 |
| FR | 2763285 A1 | 11/1998 |
| FR | 2799179 B3 | 4/2001 |
| GB | 239701 A | 9/1925 |
| GB | 450893 A | 7/1936 |
| GB | 928709 A | 6/1963 |
| JP | S49112337 A | 10/1974 |
| JP | 3150540 U | 4/2009 |
| JP | 2013237446 A | 11/2013 |
| JP | 2014094290 A | 5/2014 |
| JP | 2015044922 A * | 3/2015 |
| JP | 2016164040 A * | 9/2016 |
| KR | 20160064578 A | 6/2016 |
| WO | 2007118102 A1 | 10/2007 |

\* cited by examiner

SPINNER WHEEL ASSEMBLY FOR A LUGGAGE CASE

TECHNICAL FIELD

The present disclosure relates generally to wheeled luggage articles, and more specifically to a spinner wheel assembly for a luggage case.

BACKGROUND

Wheeled luggage articles often include double caster spinning-type wheel assemblies to aid in maneuverability. Vertically orientated double casters, however, may not easily turn for lack of mechanical advantage. The casters may also create undesirable noise and may not track in a straight line. Furthermore, debris may become caught between the two wheels, thus reducing rolling efficiency. Previous attempts to solve the above problems typically include expensive and heavy ball bearings or bushings. Wheel assemblies having such ball bearings or bushings, however, can be both heavy and costly.

It is therefore desirable to provide an improved luggage article, and more specifically an improved luggage wheel assembly that addresses one or all of the above described problems and/or which more generally offers improvements or an alternative to existing arrangements. Because luggage is price and weight sensitive, creating smooth, efficient, lightweight, and cost effective wheels that perform better in both straight line tracking and also improved quietness is important.

Documents that may be related to the present disclosure in that they include various wheel assemblies include US20150150347, U.S. Pat. No. 8,533,908, US20080120803, U.S. Pat. Nos. 5,068,943, 4,752,986, EP0075456, U.S. Pat. Nos. 4,161,803, 3,922,754, FR2007012, GB928709, U.S. Pat. Nos. 1,936,701, 1,940,823, and GB239701.

SUMMARY

According to the present disclosure there is therefore provided a luggage wheel assembly as described below and defined in the accompanying claims. The present disclosure advantageously provides a dual caster spinner wheel assembly for a luggage case, the wheel assembly including wheels angled in a V configuration. The wheel assembly includes a cantilevered, rotatable strut or fork positioned between the wheels, the strut configured to angle the wheels in the V configuration with the axles of the wheels extending from at or near the terminal end of the strut. As explained in detail below, through use of angling the wheels in a V configuration, the wheel assembly provides improved straight line tracking, quietness, and stability, among others.

Embodiments of the present disclosure may include a spinner wheel assembly for a luggage case. The wheel assembly may include a housing, a support strut rotatably coupled to the housing about a spinner axis, and a plurality of wheels each rotatably coupled to the support strut about a wheel axis. Each wheel may be spaced away from the support strut. Each wheel may rotate in a plane positioned at an angle to at least one other wheel.

Embodiments of the present disclosure may include a spinner wheel assembly for a luggage case. The wheel assembly may include a housing, a support strut rotatably coupled to the housing about a spinner axis, and two wheels rotatably coupled to opposing sides of the support strut about respective wheel axes. The wheel axes may extend at an angle relative to each other. At least a portion of the wheels and the support strut may rotate within a recess defined within the housing.

Embodiments of the present disclosure may include a luggage article. The luggage article may include a luggage case including a plurality of panels defining a storage volume, a handle for holding and moving the case, and at least one spinner wheel assembly coupled to the case. Each spinner wheel may include a housing attached to at least one panel of the luggage case, a support strut rotatably coupled to the housing about a spinner axis, and a plurality of wheels each rotatably coupled to the support strut about a wheel axis. Each wheel may rotate in a plane at an angle to at least one other wheel.

Additional embodiments and features are set forth in part in the description that follows, and will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure. One of skill in the art will understand that each of the various aspects and features of the disclosure may advantageously be used separately in some instances, or in combination with other aspects and features of the disclosure in other instances.

BRIEF DESCRIPTION OF THE DRAWINGS

The description will be more fully understood with reference to the following figures in which components are not drawn to scale, which are presented as various embodiments of the disclosure and should not be construed as a complete recitation of the scope of the disclosure, characterized in that.

DETAILED DESCRIPTION

Figure 1:
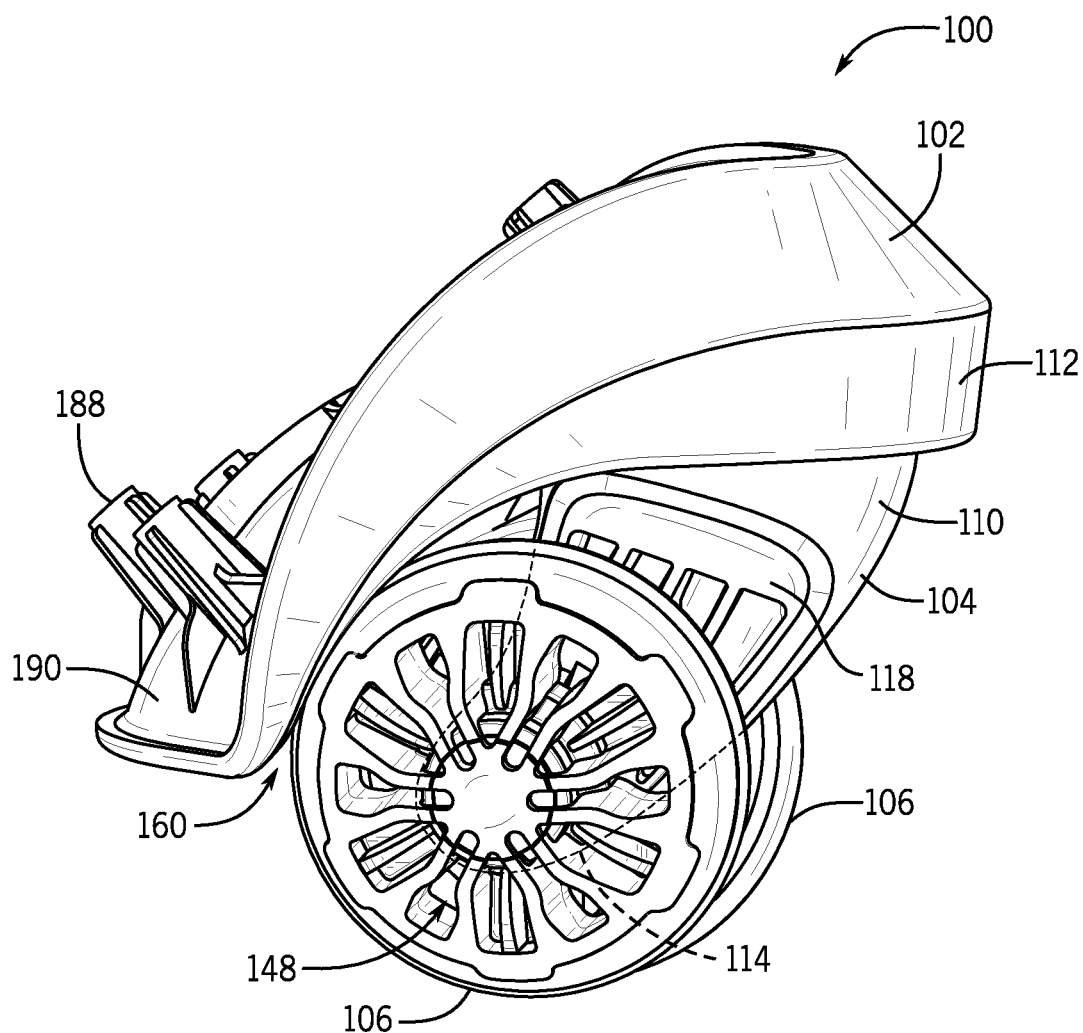
FIG. 1 is an isometric view of a luggage wheel assembly in accordance with some examples of the present disclosure.
Figure 2:
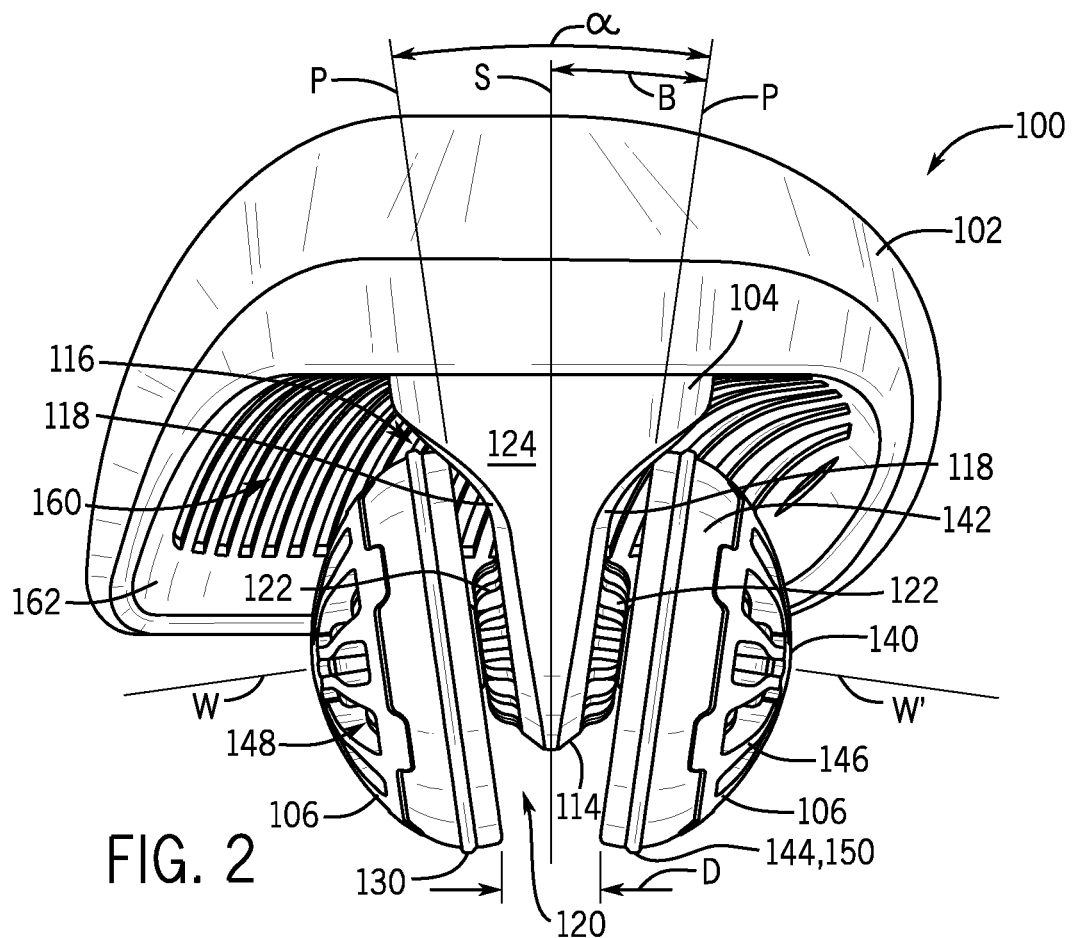
FIG. 2 is a front elevation view of the luggage wheel assembly of FIG. 1 in accordance with some examples of the present disclosure.

Referring to FIGS. 1-4, a luggage wheel assembly 100 according to an embodiment of the present disclosure includes a housing 102, a support strut or fork 104 coupled to the housing 102, and a plurality of wheels 106 (e.g., two wheels 106) each rotatably coupled to the support strut 104 about a respective wheel axis W and W' (see FIG. 2). In a preferred embodiment, the support strut 104 is rotatably coupled to the housing 102, such as cantilevered, such that the wheel assembly 100 is considered a spinner wheel assembly. For example, the support strut 104 preferably rotates about a vertically extending spinner axis S to facilitate the wheel assembly 100 to traverse across various terrains and in various directions. In such embodiments, the wheel axes W, W' may extend at an angle to the spinner axis S. As explained in detail below, the wheel assembly 100, which may be a double caster wheel, may be sized and shaped for improved tracking and operation compared to conventional spinner wheels.

Figure 3:
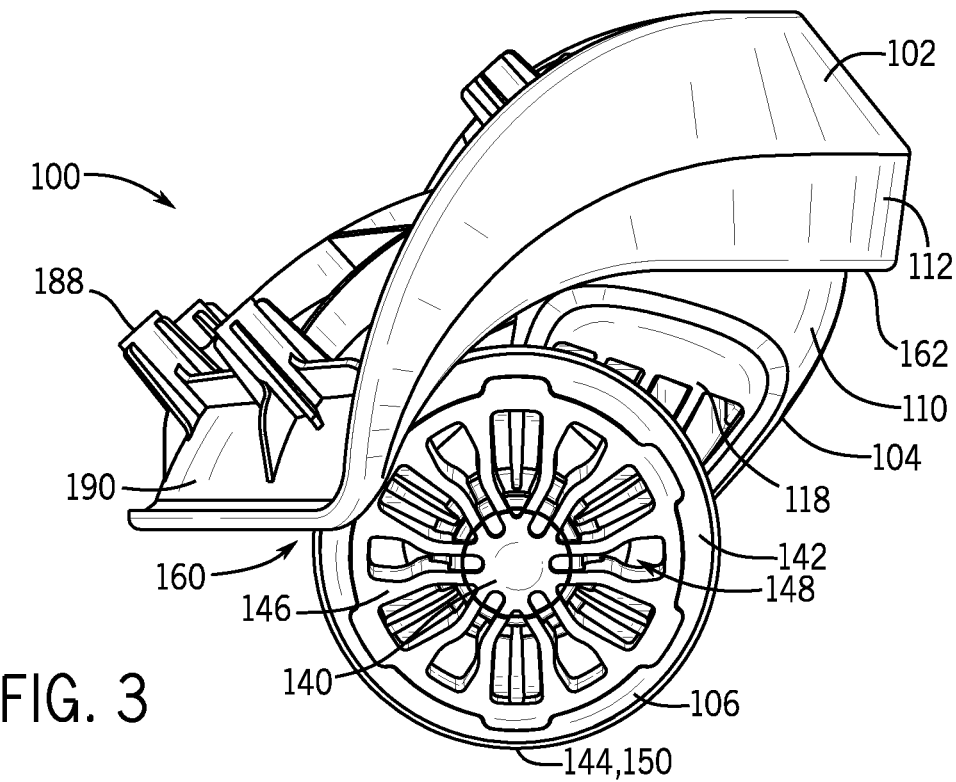
FIG. 3 is a side elevation view of the luggage wheel assembly of FIG. 1 in accordance with some examples of the present disclosure.
Figure 4:
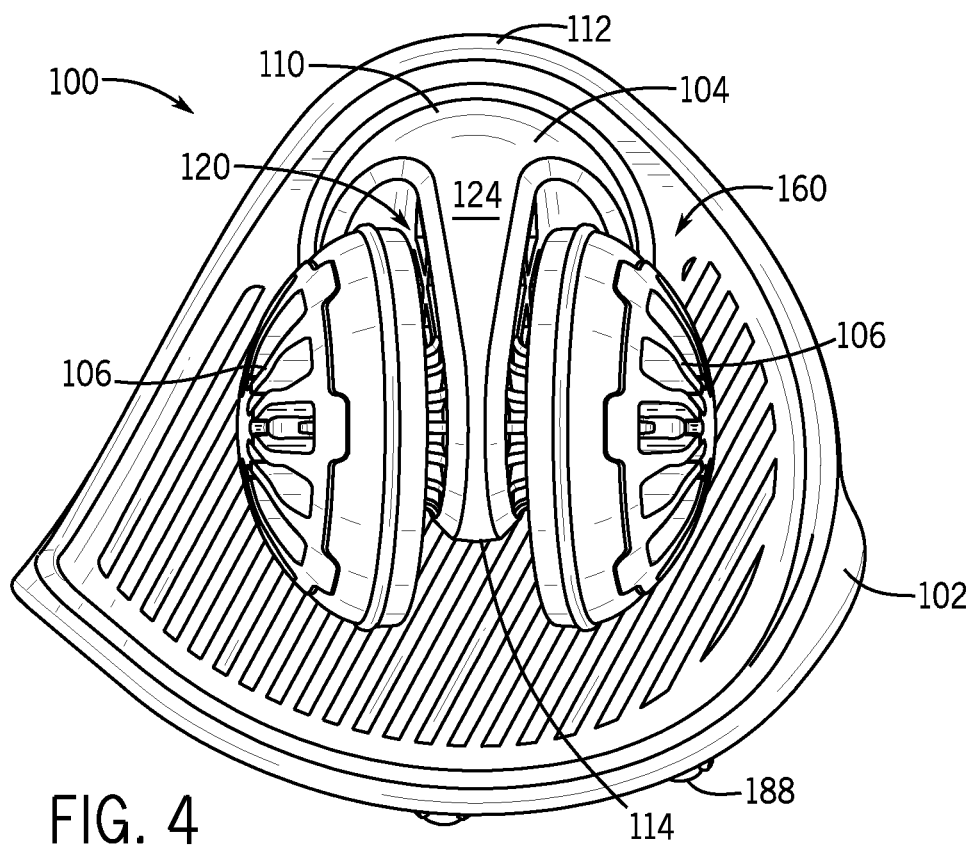
FIG. 4 is a bottom plan view of the luggage wheel assembly of FIG. 1 in accordance with some examples of the present disclosure.
Figure 5:
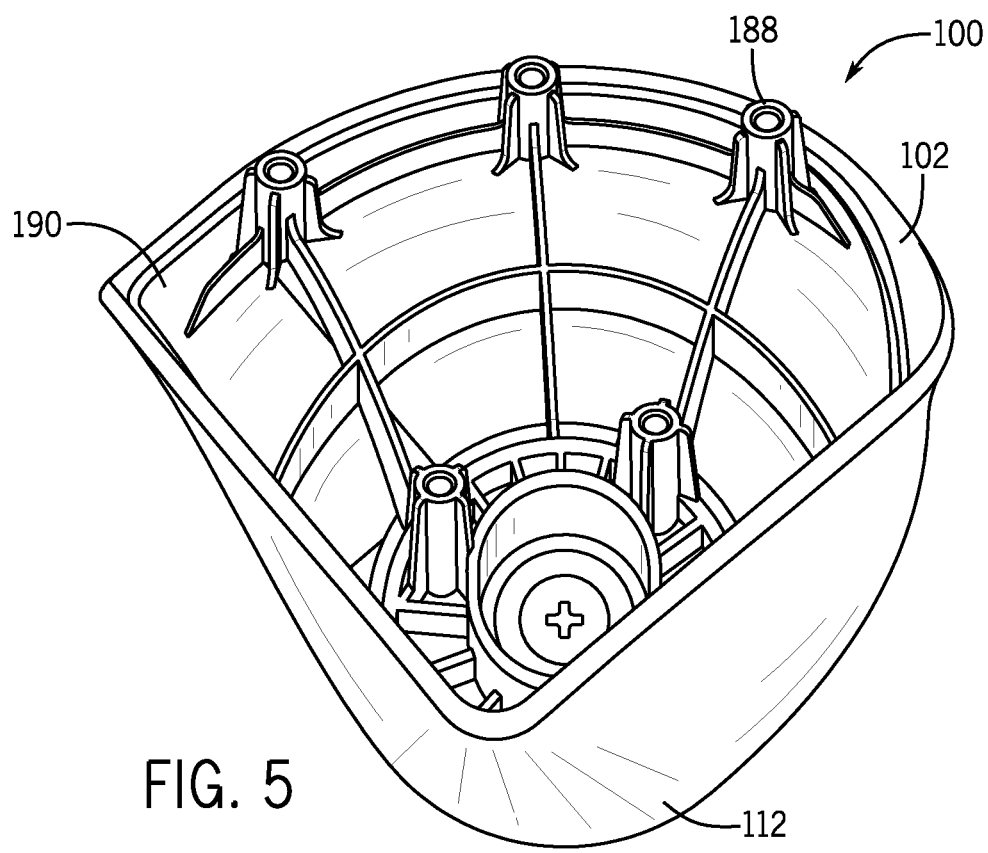
FIG. 5 is a top plan view of the luggage wheel assembly of FIG. 1 in accordance with some examples of the present disclosure.

As shown in FIGS. 1, 3, and 4, a first portion 110 of the support strut 104 may be rotatably coupled to a front portion 112 of the housing 102. In such embodiments, the wheels 106 may be rotatably coupled to a second portion 114 of the support strut 104 opposite the first portion 110. For example, the wheels 106 may be coupled to opposing sides of the support strut 104, such as to the second portion 114, such that at least a portion of the strut 104 is positioned between the wheels 106. In some embodiments, the second portion 114 of the support strut 104 may be positioned relative to the first portion 110 to facilitate movement, such as straight line and/or curved tracking, of the wheel assembly 100 across a support surface. For example, the second portion 114 may be laterally spaced from the first portion 110 such that at least a portion of the second portion 114 is positioned behind, such as below and behind, the first portion 110 when the wheel assembly 100 is traversed across a support surface. In this manner, mechanical advantage is created between the first and second portions 110, 114 of the support strut 104 to rotate the support strut 104 into a proper orientation to facilitate tracking of the wheel assembly 100 across a support surface in substantially any direction. The mechanical advantage is established by the wheel axes W, W' being laterally spaced behind the spinner axis S (relative to the direction of travel, which is to the right in FIGS. 1 and 3), which results in the appropriate orientation.

To achieve a desired aesthetic and/or functional characteristic, the support strut 104 may be curved or accurately shaped to sweep rearwardly to position the second portion 114 behind the first portion 110 relative to the direction of travel. For instance, the support strut 104 may curve in cross-section from the upper first portion 110 to the lower second portion 114. In such embodiments, the support strut 104 may include a first dimension (e.g. width) greater adjacent the engagement between the support strut 104 and the housing 102 than a second dimension (e.g. width) adjacent the engagement between the support strut 104 and the wheels 106 (as shown in dash in FIG. 1). As explained below, the arcuate shape of the support strut 104 may also decrease the size of the wheel assembly 100 for a given size and/or shape of wheel. For instance, the cross-sectional shape of the support strut 104 may define one or more contoured, concave portions 116 in which at least a portion of the wheels 106 are received (see FIG. 2). In FIG. 2 the concave portions 116 are on opposing sides of the support strut 104 and are defined by a wall 118. The wall 118 may be continuously curved, or may have linear segments, or a combination. In such embodiments, the concave portions 116 may be sized and shaped to receive at least a portion of wheels 106 of a particular size and shape to at least decrease the overall width of the wheel assembly 100, also referred to as the footprint size, as seen in FIG. 2. The concave portions 116 also and independently position the wheels 106 in proper alignment or position, as explained below. A boss 122 may extend from the wall 118 of each concave portion 116, and oppositely of each other, to receive the axle for each wheel 106. Each boss 122 provides improved dimensional stability for the axle for each wheel 106. As shown, the wheel axles may extend from at or near the terminal end of the strut 104, which may be defined by the second portion 114.

Referring now to FIGS. 1-4, the wheels 106 may be coupled to the support strut 104 in a manner to facilitate improved straight line tracking and operation compared to conventional spinner wheels. For instance, in one embodiment, each of the wheels 106 may be rotatably coupled to the support strut 104 in a particular spaced relationship with the support strut 104. As such, a space 120 may be defined between the lower portions of each of the wheels 106 engaging the support surface (at the contact area) and the bottom end of the lower portion 114 of the support strut 104. This space may be generally be trapezoidal in shape, with the side walls formed by the inner edges of the opposing wheels, which angle upwardly and outwardly so the space is narrower adjacent the ground than adjacent the bottom portion 114. This configuration limits small particles, such as sand or debris, from being lodged in this space 120. In this manner, the rolling efficiency of the wheel assembly 100 may be less likely to small debris in the space 120 between the bottom portions of the wheels 106 and the support strut 104.

The wheels 106 are coupled to the support strut 104 in an angled manner, as best seen in FIG. 2. For example without limitation, the wheel axes W, W' may extend at an angle relative to one another such that each wheel 106 rotates in a plane P at an angle to at least one other wheel 106. The orientation of the wheel axes W, W' and wheels 106 may vary depending on the desired characteristics of the wheel assembly 100. In one embodiment, at least one of the wheel axes W, W' may extend at an angle relative to a horizontal plane of the wheel assembly 100 (i.e., upwards or downwards) such that at least one wheel 106 rotates in a non-vertical plane. In a preferred embodiment, opposing wheels 106 are angled in a V configuration, preferably symmetrically, to define an angle a between the rotational planes P of the wheels 106. As shown in at least FIG. 2, the wheel axes W, W' may be angled vertically outwardly from the support strut 104 such that opposing wheels 106 are further apart at a top portion and positioned closer together adjacent a contact area between the bottom portion of the wheels 106 at the contact area of the support surface, as explained below. In such embodiments, the distance between the wheels 106 may increase with distance away from the contact area (i.e., the wheels 106 are "positively cambered"), though negative camber of the wheels is contemplated. In some embodiments, the wheel axes W, W' may be aligned in the same vertical plane, though it is contemplated the wheel axes W, W' may be angled differently in more than one plane or direction to create both camber (angled in vertical plane) and toe-in (angled in horizontal plane) within the wheel assembly 100. The spinner axis S may be laterally spaced (e.g., forwardly spaced) from the plane(s) of the wheel axes W, W' to facilitate proper tracking of the wheel assembly 100, such as to create the mechanical advantage discussed above.

As best seen in FIG. 2, the rotational plane P of each wheel 106 may extend at an angle $\beta$ to a vertical axis of the wheel assembly 100, as defined by the spinner axis S in one embodiment. In such embodiments, the angle $\beta$ between the vertical axis and each wheel's rotational plane P may be between about 5 degrees and about 22 degrees, with a preferred angle of about 8 degrees. In this manner, the angle $\alpha$ between opposing wheels 106 may vary between about 10 degrees and about 44 degrees, with a preferred angle of about 16 degrees. In such embodiments, the support strut 104 may include a V-shape body 124 in cross-section, which may account for or define the angle α between opposing wheels 106. The V-shape body 124 may be defined at least partially by the respective walls 118 of the concave portions 116. The walls 118 of the concave portions 116 may be generally parallel to the inside edge of the adjacent wheel 106, or may be angled relative to the inside edge of the adjacent wheel 106. As noted above, the wheels 106 may converge towards each other with proximity to a support surface such that at least one wheel 106 includes a positive camber. Though shown and described as including a positive camber, the wheels 106 in some embodiments may include a negative camber to offer at least the same advantages discussed herein.

In the embodiments described herein, the cambered nature of the wheels 106 may provide improved operation. For example, in addition to vertical loading of the wheels 106, the relative angling of the wheels 106 may load the wheels 106 laterally on their respective axles to keep each wheel 106 firmly engaged with its axle end and limit vibration of the wheels 106 during operation. This reduces the need for heavy and costly ball bearings and bushings, for instance. Additionally or alternatively, the wheel assembly 100 may include improved straight line tracking as the angle α between the wheels 106 increases lateral stability of the wheel assembly 100, for instance, thus reducing pressure and stress from a user's hand to "force" the wheel assembly 100 to track straight. The camber also creates a mechanical turning advantage over standard vertical (i.e., non-cambered) casters due at least partially to lateral forces present in the wheel assembly 100.

In addition to the angled nature of the wheels 106, the lateral positioning of opposing wheels 106 may be defined to achieve a desired characteristic. For instance, as shown in FIG. 2, the wheels 106 may be spaced apart a distance D at the contact area between the wheels 106 and the support surface. The lateral spacing between the lower portion of the wheels 106 at the contact area may aid in the improved operation of the wheel assembly 100. In one embodiment, the distance D between the wheels 106 at the contact area may limit the effects of debris positioned between the wheels 106 when traversed across the support surface. For example, the camber of the wheel assembly 100 may eliminate debris caught between the wheels 106 for increased rolling efficiency. Furthermore, the camber of the wheels 106 may allow debris to naturally be cleared from between the wheels 106 as the wheels 106 turn because the relative spacing between the wheels increases as the wheels rotate. Additionally or alternatively, the spaced relationship between the wheels 106 at the contact area may create a plurality of contact areas 130, the plurality of contact areas 130 with the ground and where the wheels 106 contact the ground in use operable to provide a relatively wide stance of the wheel assembly 100 for improved stability and tracking.

Referring to FIGS. 1-4, the wheels 106 may be sized and shaped to facilitate straight line tracking of the wheel assembly 100, for instance. In one embodiment, each wheel 106 may include a partially hemispherical shape. As shown, each wheel 106 includes an central hub portion 140 rotatably coupled by an axle to the support strut 104. An outer rim portion 142 defining a contact surface 144 of the wheel 106 may be annularly spaced from the hub portion 140. In such embodiments, a plurality of cantilevered spokes 146 may connect and extend between the hub and rim portions 140, 142. The spokes 146 may be operable to reduce the weight of the wheels 106 and provide channels 148 through which debris and/or fluid may be carried away from the wheel assembly 100. In some embodiments, a radially extending ridge or ring 150 may be positioned on the rim portion 142 to define a narrow contact surface 144 of the wheel 106. A narrow contact surface may help avoid surface features on the support surface and allow for a smoother ride. The ridge 150, which may be formed from the same or a different material from the rim portion 142, and may be integrally formed with the rim portion 142, or may be a separate member received within an annular groove formed on the rim portion 142, and may be a wear item that is replaceable to maintain smooth operation of the wheel assembly 100.

Referring now to FIGS. 1-3, the housing 102 may be sized and shaped to reduce the overall size of the wheel assembly 100. In one non-exclusive embodiment, a recess 160 may be defined within the housing 102, such as by an exterior wall 162 of the housing 102. As shown, the recess 160 may have a curved profile defining a contoured recess to receive the wheel assembly 100 and allow the wheel assembly 100 to rotate freely about the spinner axis S. For example, the recess 160 may be dome-shaped including an arc of curvature less than 135 degrees, and preferably such as less than 90 degrees. In such embodiments, at least a portion of the wheels 106 and the support strut 104 may rotate within the recess 160. The recess 160 may include a depth dimension to receive at least a portion of a height dimension of the support strut 104 and/or wheels 106. For example, the recess 160 may be sized to receive up to ¼ the diameter of the wheels 106, at least ¼ the diameter of the wheels 106, up to ½ the diameter of the wheels 106, up to ¾ the diameter of the wheels 106, or more than ¾ the diameter of the wheels 106 when viewing the wheel assembly 100 from a front elevation view (see FIG. 2). In this manner, the size (e.g., the height) of the wheel assembly 100 may be minimized such that the internal size of an associated piece of luggage (see FIGS. 6 and 7) may be maximized while maintaining the outer dimensions of the luggage constant.

The wheel assembly 100 may be formed from a variety of materials and means. For example, the housing 102, the support strut 104, and the wheels 106 may be formed from a thermoplastic material (self-reinforced or fiber reinforced), ABS, polycarbonate, polypropylene, polystyrene, PVC, polyamide, and/or PTFE, among others. The housing 102, support strut 104, and wheels 106 may be formed or molded in any suitable manner, such as by plug molding, blow molding, injection molding, or the like.

Figure 6:
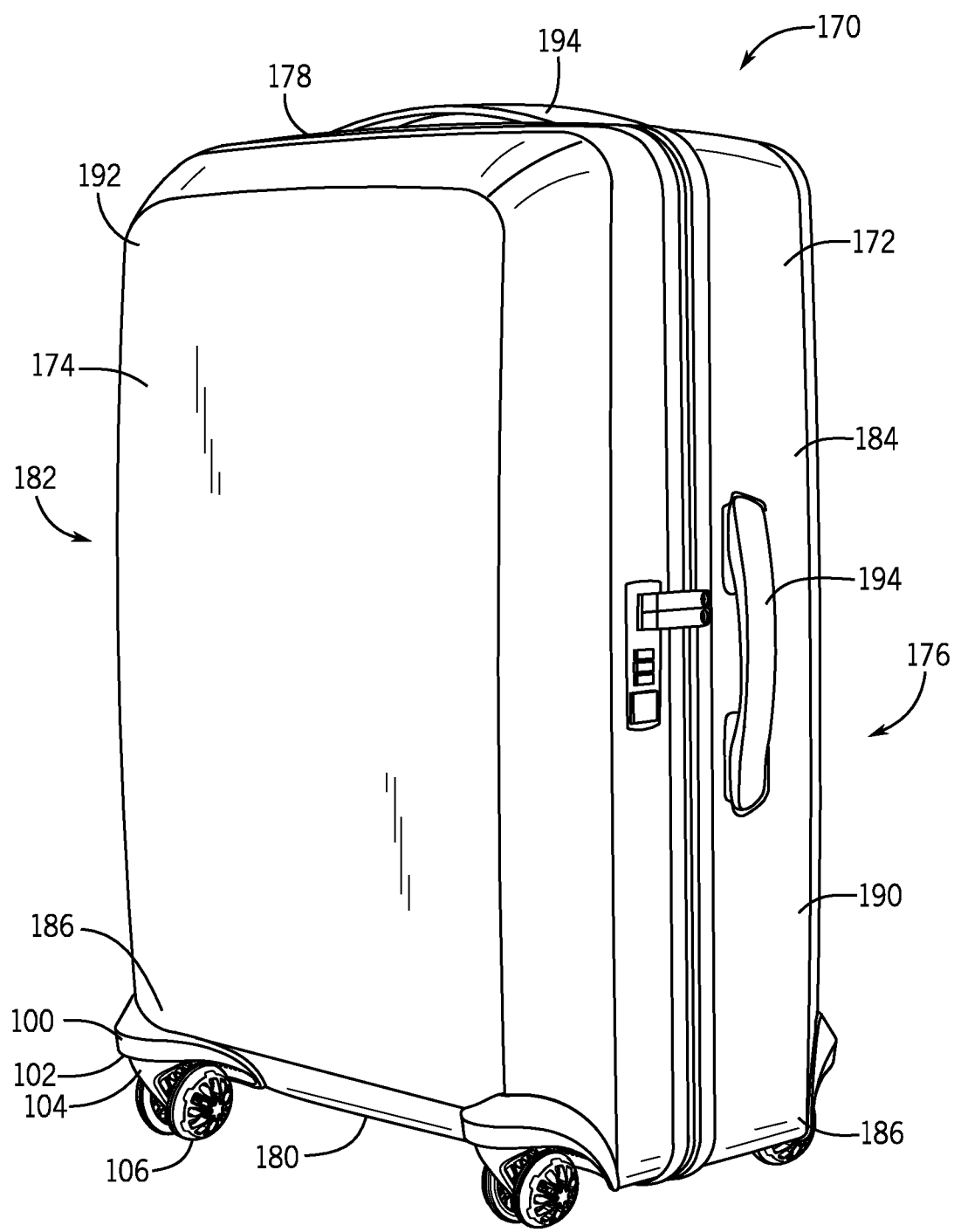
FIG. 6 is a top front perspective view of the luggage wheel assembly of FIG. 1 coupled to a luggage case in accordance with some examples of the present disclosure.
Figure 7:
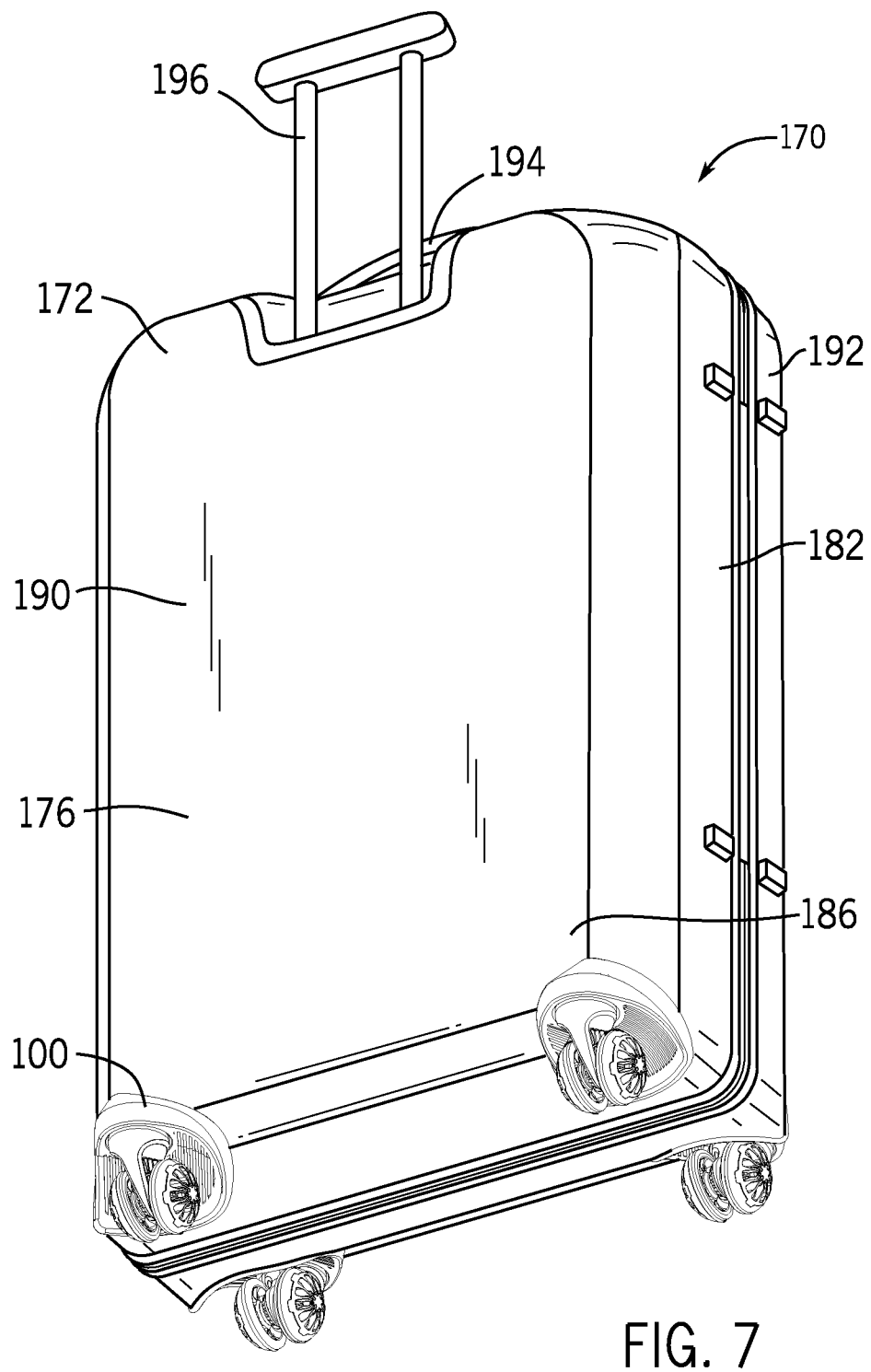
FIG. 7 is a bottom rear perspective view of the luggage wheel assembly of FIG. 1 coupled to the luggage case of FIG. 6 in accordance with some examples of the present disclosure.

Referring now to FIGS. 6 and 7, the wheel assembly 100 is associated with a luggage article 170. The luggage article 170 according to an embodiment of the present disclosure includes a luggage case 172 formed from a plurality of walls or panels defining an internal compartment and a storage volume in which to carry a user's belongings. As shown, the luggage article 170 includes opposing front and rear panels 174, 176, opposing top and bottom panels 178, 180, and opposing left and right panels 182, 184 that collectively define the outer structure of the luggage case 172. The opposing front and rear panels 174, 176 may define major faces of the luggage article 170, with the top, bottom, left, and right panels 178, 180, 182, 184 forming minor faces. Corner regions 186 are defined by the intersection of any two or three adjacent panels of the luggage case 172. For example, the luggage case 172 of FIGS. 6 and 7 includes four lower corner regions 186, each formed by the intersection of the bottom panel 180 with the left and right panels 182, 184 and/or the front and rear panels 174, 176. As shown in FIGS. 6 and 7, at least one wheel assembly 100 may be coupled to the luggage case 172. For example, the luggage case 172 may include at least two wheel assemblies 100 (e.g., four wheel assemblies 100) coupled to at least the bottom panel 180, such as at the corner regions 186. To couple the wheel assembly 100 to the luggage case 172, the housing 102 may include a plurality of attachment structures 188 extending from an inner surface 190 of the housing 102 (see FIG. 1, for instance). In such embodiments, the attachment structures 188 may be operable to received fasteners or corresponding structure defined within or on the luggage case 172.

The luggage case 172 may be substantially any type of luggage article (e.g., bag, case, rollable backpack, etc.), though in preferred embodiment the luggage case 172 is an upright spinner case. In such embodiments, the luggage case 172 includes other features for convenience, such as a base 192, a lid 194 pivotably coupled to the base 192, and at least one carry handle 196. In some embodiments, the luggage case 172 may include a telescoping tow handle 198 extendable from a rear of the luggage case 172 that can be used to carry and/or wheel the luggage case 172 on the wheels 106 by a user. The luggage case 172 may be moldable hardside material, softside material, or a combination of hardside material and softside material. The softside material may be nylon, canvas, polyester, leather, PVC, polypropylene, polyethylene, and/or PTFE, among others. The hardside material may be a thermoplastic material (self-reinforced or fiber reinforced), ABS, polycarbonate, polypropylene, polystyrene, PVC, polyamide, and/or PTFE, among others. Like the wheel assembly 100, the luggage case 172 may be formed or molded in any suitable manner, such as by plug molding, blow molding, injection molding, or the like.

All relative and directional references (including: upper, lower, upward, downward, left, right, leftward, rightward, top, bottom, side, above, below, front, middle, back, vertical, horizontal, and so forth) are given by way of example to aid the reader's understanding of the particular embodiments described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

The invention claimed is:

1. A luggage case comprising:
   a plurality of panels defining a storage volume;
   a handle for holding and moving the luggage case; and
   at least one spinner wheel assembly coupled to the luggage case, each spinner wheel assembly comprising:
      a housing;
      a support strut having a V-shaped body and rotatably coupled to the housing about a spinner axis; and
      a pair of wheels each rotatably coupled to the support strut about a wheel axis and spaced away from the support strut, each wheel rotating in a plane positioned at an angle to the other wheel, wherein the wheels are angled symmetrically in a V configuration, the support strut further comprising a bottom portion, and a bottom most surface of the bottom portion is closer to the wheel axis than a support surface or ground.

2. The luggage case of claim 1, wherein at least one wheel of the spinner wheel assembly rotates in a non-vertical plane.

3. The luggage case of claim 1, wherein the spinner axis is laterally spaced from the plane of the wheel axes, wherein the plane is defined relative to a support surface and extends above the support surface.

4. The luggage case of claim 1, wherein the wheels are angled between about 10 degrees and about 44 degrees relative to each other.

5. The luggage case of claim 4, wherein the wheels are angled about 16 degrees relative to each other.

6. The luggage case of claim 1, wherein the wheels are spaced apart a distance at a contact area between the wheels and a support surface or ground contact surface.

7. The luggage case of claim 6, wherein the distance between the wheels increases with distance away from the support surface or ground contact surface.

8. The luggage article of claim 1, wherein each wheel is partially hemispherically-shaped and includes at least a partially domed ground contact surface.

9. A luggage case comprising:
   a plurality of panels defining a storage volume;
   a handle for holding and moving the luggage case; and
   at least one spinner wheel assembly coupled to the luggage case, each spinner wheel assembly comprising:
      a housing;
      a support strut having a V-shaped body and rotatably coupled to the housing about a spinner axis; and
      two wheels rotatably coupled to opposing sides of the support strut about respective wheel axes, the wheel axes extending at an angle relative to each other;
   wherein at least a portion of the wheels and the support strut rotate within a recess defined within the housing, and
      wherein the wheels are angled symmetrically in a V configuration, and
      the support strut further comprising a bottom portion, and a bottom most surface of the bottom portion is closer to the wheel axis than a support surface or ground.

10. The luggage case of claim 9, wherein at least one of the wheel axes extends at an angle relative to a horizontal plane of the wheel assembly.

11. The luggage case of claim 10, wherein the at least one wheel axis is angled vertically downward from the support strut.

12. The luggage case of claim 9, wherein the support strut includes one or more contoured portions in which at least a portion of the wheels rotates.

13. The luggage article of claim 9, wherein each wheel is partially hemispherically-shaped and includes at least a partially domed ground contact surface.

14. A luggage article comprising:
   a luggage case comprising a plurality of panels defining a storage volume;
   a handle for holding and moving the luggage case; and
   at least one spinner wheel assembly coupled to the luggage case, each spinner wheel assembly including:
      a housing attached to at least one panel of the luggage case;

a support strut having a V-shaped body and rotatably coupled to the housing about a spinner axis; and a pair of wheels each rotatably coupled to the support strut about a wheel axis, each wheel rotating in a plane at an angle to at least one other wheel, and wherein at least one wheel includes a positive camber, wherein the support strut further comprises a bottom portion, and a bottom most surface of the bottom portion is closer to the wheel axis than a support surface or ground.

15. The luggage article of claim 14, wherein the at least one spinner wheel assembly includes four spinner wheel assemblies attached to at least the bottom panel of the luggage case.

16. The luggage article of claim 14, wherein each wheel includes:

an inner hub portion rotatably coupled to the support strut;

an outer rim portion defining a contact surface of the wheel; and a plurality of cantilevered spokes connected between the hub and rim portions.

17. The luggage article of claim 14, wherein the spinner axis is vertically extending.

18. The luggage article of claim 14, wherein the wheels of each spinner wheel assembly are laterally positioned close together adjacent a contact area between the wheels and the support surface or ground contact surface.

19. The luggage article of claim 18, wherein the wheels are laterally spaced apart a distance at the support surface or ground contact surface.

20. The luggage article of claim 14, wherein each wheel is partially hemispherically-shaped and includes at least a partially domed ground contact surface.

* * * * *